(12) United States Patent
Sugioka et al.

(10) Patent No.: US 6,180,915 B1
(45) Date of Patent: Jan. 30, 2001

(54) LASER MACHINING METHOD AND LASER MACHINING APPARATUS

(75) Inventors: Koji Sugioka, Yono; Jie Zhang, Wako; Katsumi Midorikawa, Tachikawa, all of (JP)

(73) Assignee: The Institute For Physical And Chemical Research, Wako (JP)

(*) Notice: Under 35 U.S.C. 154(b), the term of this patent shall be extended for 0 days.

(21) Appl. No.: 09/234,945

(22) Filed: Jan. 21, 1999

(30) Foreign Application Priority Data

Jan. 21, 1998 (JP) .................................................. 10-023879

(51) Int. Cl.[7] .................................................. B23K 26/38
(52) U.S. Cl. ........................................................ 219/121.69
(58) Field of Search ..................... 219/121.68, 121.69, 219/121.6, 121.86, 121.76, 121.72

(56) References Cited

U.S. PATENT DOCUMENTS 4,689,467 * 8/1987 Inoue .................................. 219/121.6
5,558,788 * 9/1996 Mashburn ........................ 219/121.68
5,987,920 * 11/1999 Bosman et al. .................... 219/121.6

FOREIGN PATENT DOCUMENTS

| 0 761 377 A1 | 8/1995 | (EP) . |
| 2 126 956 | 8/1983 | (GB) . |
| 4-356388 * | 12/1992 | (JP) . |
| 10-216979 * | 8/1998 | (JP) . |

* cited by examiner

*Primary Examiner*—Geoffrey S. Evans
(74) *Attorney, Agent, or Firm*—Marguerite Del Valle

(57) ABSTRACT

In order to form a fine pattern at high speed with respect to a material such as quartz glass exhibiting a remarkable band gap, having a short wavelength at absorption edge of light, and having high bond energy between constituent atoms, laser beam being transparent as to a material to be worked is irradiated thereupon, at the same time, plasma is produced at a place close to an objective surface of the material to be worked, and ablation is generated on the objective surface of the material to be worked by means of interactions between the plasma and laser beam irradiated upon the material to be worked, thereby to work the material.

12 Claims, 6 Drawing Sheets

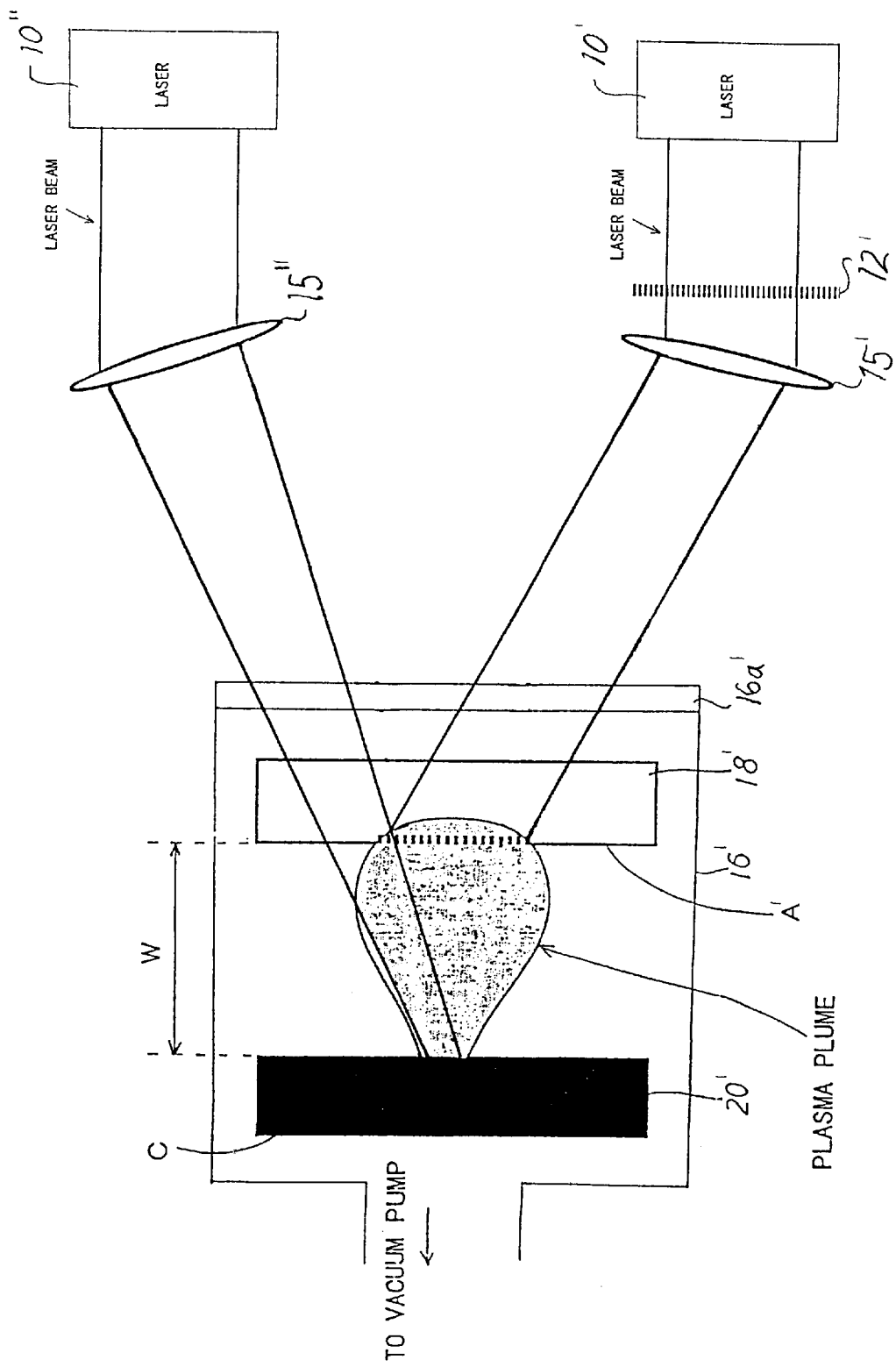

LASER MACHINING METHOD AND LASER MACHINING APPARATUS

BACKGROUND OF THE INVENTION

1. Field of the Invention

The present invention relates to a laser machining method and a laser machining apparatus, and more particularly to a laser machining method and a laser machining apparatus by which a fine pattern can be formed on a material at high speed.

2. Description of the Related Art

A variety of materials have been heretofore worked in accordance with wet etching method wherein various chemical solutions are used, or laser ablation method wherein various types of laser are used.

However, it has been known that among a variety of materials, for example, quartz glass has an absorption edge of light of around 170 nm, besides bond energy between constituent atoms is also remarkable, so that it is difficult to form a fine pattern on a material at high speed in accordance with such a conventional machining method as described above.

More specifically, when quartz glass is worked up according to wet etching method wherein a chemical solution such as acid is used, a speed in working is fast, but there has been a problem of poor controllability for working profile and working speed of the quartz glass, so that the method is not suitable for fine working.

Furthermore, although reactive ion etching method (RIE) is a machining method suitable for effecting precisely fine working of quartz glass, there has been a problem of slow working speed (It is known to be a working speed of 1 nm/s or less in case of working SiO2).

Moreover, there has been such a problem that another lithographic step using a resist is necessary for effecting fine pattern working in wet etching method wherein the above described chemical solution such as acid is employed or reactive ion etching method, so that the whole steps for working treatment become complicated, resulting in a reason of requiring a long period of time.

On the other hand, there is laser ablation method as a method for pattern-working a material at high speed without employing a resist, but it is necessary that a wavelength of laser beam applied in laser ablation method has a high absorption coefficient with respect to a material to be worked. For this reason, when quartz glass is intended to work in accordance with laser ablation method, it is required to use laser beam having a wavelength of 170 nm or less. In this connection, however, there has been such a problem that a laser applicable for working of quartz glass is not substantially present with taking costs for photon, and output thereof into consideration.

OBJECT AND SUMMARY OF THE INVENTION

The present invention has been made in view of a variety of the problems as described above involved in the prior art. Accordingly, an object of the present invention is to provide a laser machining method and a laser machining apparatus by which a fine pattern can be formed at high speed with respect to a material such as quartz glass which exhibits a short wavelength at absorption edge of light and has high bond energy between constituent atoms.

In order to achieve the above described object, a fine pattern is formed on a material to be worked in accordance with ablation with the use of transparent laser beam exhibiting no absorption with respect to the material to be worked and without employing any resist in the present invention.

Thus, according to the present invention, a variety of materials can be worked by means of a laser producing laser beam having a wavelength extending over visible region, ultraviolet region, and infrared region.

More specifically, a laser machining method according to the present invention, comprises the steps of irradiating transparent laser beam with respect to a material to be worked; producing plasma simultaneously with the above described irradiation at a place close to an objective surface of the material to be worked; and generating ablation on the objective surface of the material to be worked by means of interactions of the above described plasma with the laser beam irradiated upon the material to be worked, thereby to work the above described material.

Furthermore, a laser machining method according to the present invention, comprises the steps of irradiating transparent laser beam with respect to a material to be worked through a mask having a predetermined pattern; producing plasma simultaneously with the above described irradiation at a place close to an objective surface of the material to be worked; and generating ablation corresponding to the predetermined pattern of the above described mask on the objective surface of the material to be worked by means of interactions of the above described plasma with the laser beam irradiated upon the material to be worked through the mask, thereby to work the above described material.

Moreover, a laser machining apparatus according to the present invention, comprises a material to be worked having an objective surface to be worked by means of laser; a target opposed to the objective surface of the material to be worked; and a laser for irradiating transparent laser beam with respect to said material to be worked and at the same time, irradiating the transparent laser beam upon the above described target to produce plasma from the target between the aforesaid target and the objective surface of the above described material to be worked; ablation being generated on the objective surface of the material to be worked by means of interactions between the plasma produced from the target and laser beam irradiated upon the material to be worked from the laser, thereby to work the material.

Still further, a laser machining apparatus according to the present invention, comprises a material to be worked having an objective surface by means of laser; a target opposed to the objective surface of the material to be worked; a laser for irradiating laser beam upon the material to be worked to perform working thereof; and a second laser for irradiating laser beam upon the above described target to produce plasma from the target between the aforesaid target and the objective surface of the material to be worked; ablation being generated on the objective surface of the material to be worked by means of interactions between the plasma produced from the target and laser beam irradiated upon the above described material to be worked from the laser, thereby to work the above described material.

Yet further, a laser machining apparatus according to the present invention, comprises a material to be worked having an objective surface by means of laser; a laser for irradiating laser beam upon the material to be worked to perform working thereof; and a plasma producing means for producing plasma at a place close to the objective surface of the above described material to be worked; ablation being generated on the objective surface of the material to be worked by means of interactions between the plasma produced from the above described plasma producing means and laser beam irradiated upon the material to be worked from the laser, thereby to work the above described material.

Moreover, a laser machining apparatus according to the present invention, comprises further a mask having a predetermined pattern and disposed between the above described laser and the above described material to be worked; the laser irradiating laser beam upon the above described material to be worked through the mask; and ablation corresponding to the predetermined pattern of the mask being generated on the objective surface of the material to be worked by means of interactions between the plasma produced from the plasma producing means and laser beam irradiated upon the material to be worked from the laser through the mask, thereby to work the above described material.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 1a is a conceptual diagram in constitution of another embodiment of a laser machining apparatus according to the present invention;

DETAILED DESCRIPTION OF THE PREFERRED EMBODIMENTS

An embodiment of the laser machining method and the laser machining apparatus according to the invention will be described in detail hereinafter in conjunction with the accompanying drawings.

Figure 1:
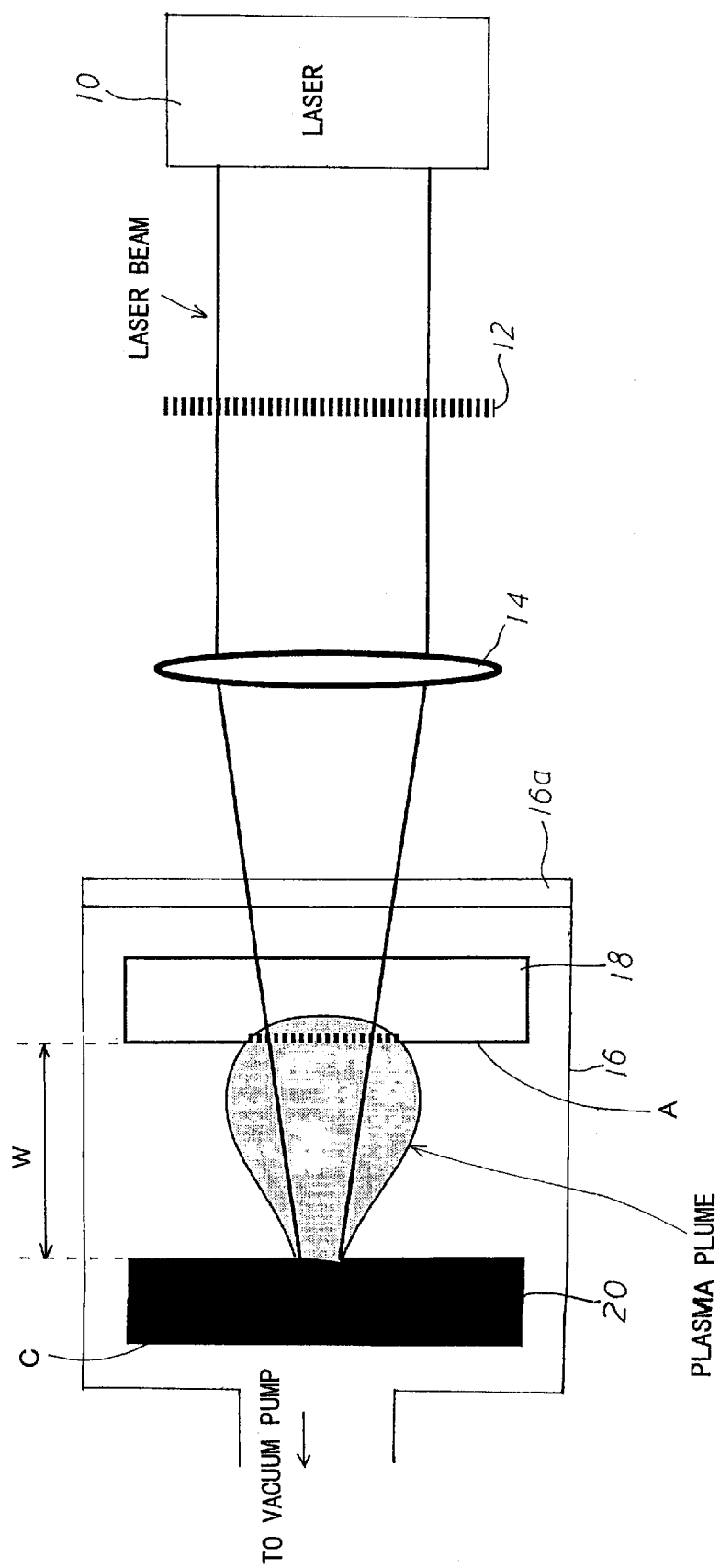
FIG. 1 is a conceptual diagram in the constitution of an embodiment of a laser machining apparatus according to the present invention.

FIG. 1 is a conceptual diagram in the constitution of an embodiment of a laser machining apparatus according to the present invention wherein the laser machining apparatus is composed of a laser 10 for irradiating laser beam, a mask 12 having a fine pattern, a lens 14 for collecting laser beam, a vacuum chamber 16 including a window section 16a to which can be input laser beam, and a material to be worked 18 which is opposed to a target 20 in the vacuum chamber.

In this case, the laser 10, the mask 12, the lens 14, the vacuum chamber 16, the material to be worked 18, and the target 20 are arranged in such that laser beam irradiated from the laser 10 passes through the mask 12 to be collected by the lens 14, the laser beam thus collected by the lens 14 transmits through the window section 16a of the vacuum chamber 16 to be input thereinto, the laser beam input into the vacuum chamber 16 is irradiated on the target 20 through the material to be worked 18.

In this conditions, a distance W defined between the material to be worked 18 and the target 20 may be fixed to, for example, 20 $\mu$m to 8 mm.

As the laser 10, the one which can irradiate transparent laser beam which is not absorbed by the material to be worked 18, in other words, which can irradiate laser beam having a wavelength which is not absorbed by the material to be worked 18 should be selected, and it is preferable to use a pulse laser.

Moreover, a degree of vacuum in the vacuum chamber 16 is selected to be the one at which production of plasma which will be described hereinafter can be maintained.

Figure 5:
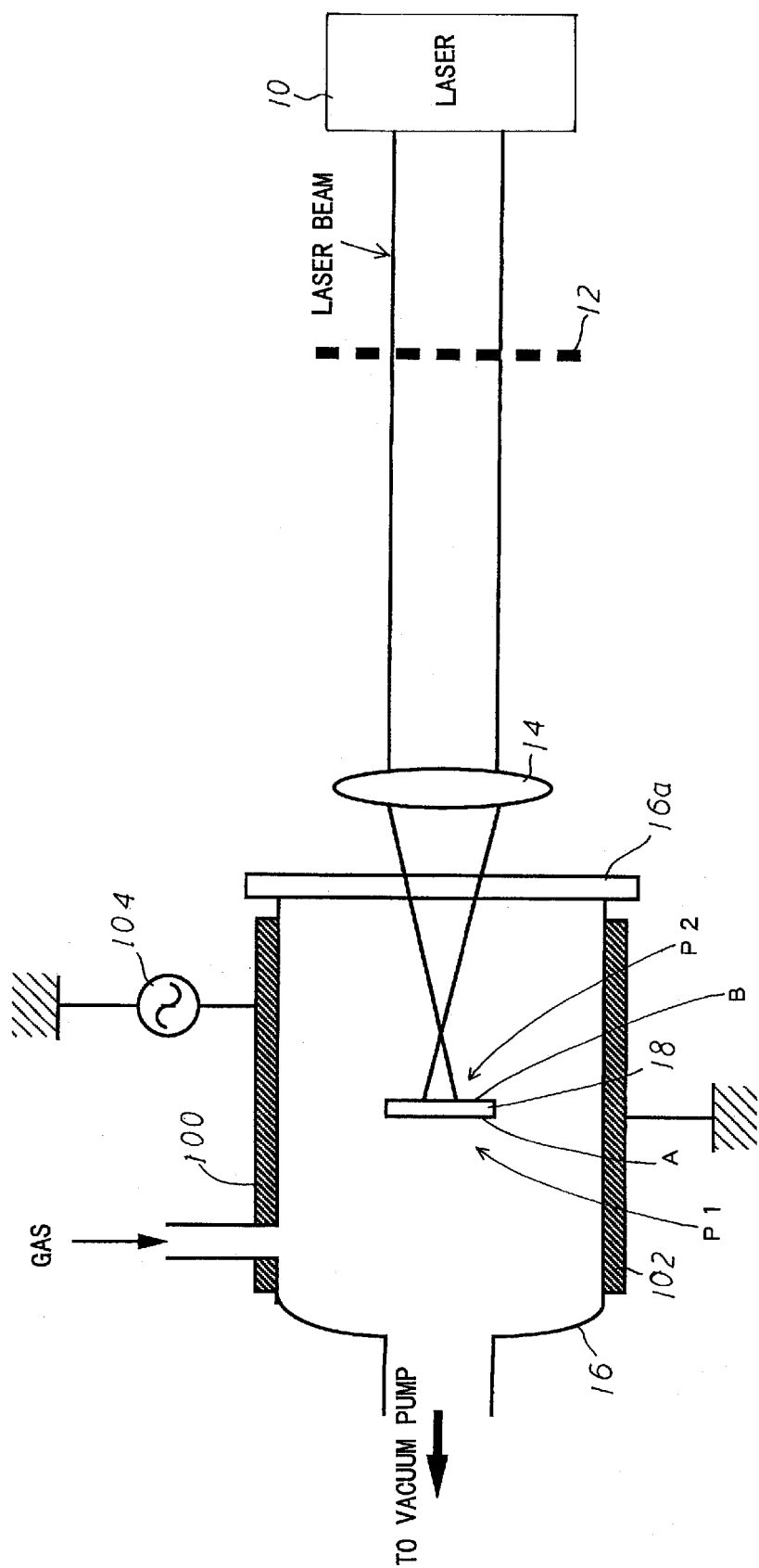
FIG. 5 is a conceptual diagram in the constitution of another embodiment of a laser machining apparatus according to the present invention.

While applications of the present invention are not affected by a position of the focus of the laser beam collected by the lens 14, even if the position lies anywhere, it may be positioned, for example, on a side C of the target 20 opposed to the material to be worked 18 (see FIG. 1), or a place defined between the material to be worked 18 and the lens 14 (see FIG. 5).

In the following, experimental results wherein laser beam of fourth harmonic derived from an Nd:YAG laser as the laser 10 was irradiated with repeated frequency 1 Hz in a pulse width of 8 ns by employing quartz glass as the material to be worked 18 and stainless steel as the target 20 will be described.

In this case, it is to be noted that a wavelength of fourth harmonic of the Nd:YAG laser is 266 nm, and such laser beam of 266 nm wavelength is transparent with respect to quartz glass, so that the laser beam is never absorbed by quartz glass.

More specifically, fourth harmonic having 266 nm wavelength and derived from the Nd:YAG laser is irradiated upon the material to be worked (quartz glass) 18 and the target (stainless steel) 20 through the mask having a fine pattern and the lens 14.

In this occasion, plasma is produced from the target (stainless steel) 20 by means of the fourth harmonic of Nd:YAG laser having 266 nm wavelength which was irradiated upon the target (stainless steel) 20 through the material to be worked (quartz glass) 18 to form plasma plume [the plasma is produced between the target (stainless steel) 20 and the material to be worked (quartz glass) 18 in this case], whereby ions, radicals, and electrons having high energy are produced.

As a result of interactions of the fourth harmonic of the Nd:YAG laser having 266 nm wavelength and input to the material to be worked (quartz glass) 18 with emission of light, ions, radicals, and electrons derived from plasma, ablation occurs on a surface A (the surface A is the one on a side on which plasma exists) being the objective surface to be worked and opposed to the target (stainless steel) 20 for the material to be worked (quartz glass) 18, whereby a fine pattern contained in the mask 12 is worked on the material.

FIG. 1a is a conceptual diagram in the constitution of another embodiment of a laser machining apparatus according to the present invention wherein the laser machining apparatus is composed of a first laser 10' for irradiating laser beam upon a material to be worked 18' and a second laser 10" for irradiating simultaneously a laser beam upon a target 20', a mask 12' having a fine pattern, first and second lenses 15' and 15" for collecting the laser beams, a vaccum chamber 16' including a window section 16a' to which can be input the laser beams, and a material to be worked 18' which is opposed to a target 20' in the vacuum chamber. In this condition, a distance W defined between the material to be worked 18' and the target 20" may be fixed to, for example, 20 $\mu$m to 8 mm.

Figure 2:
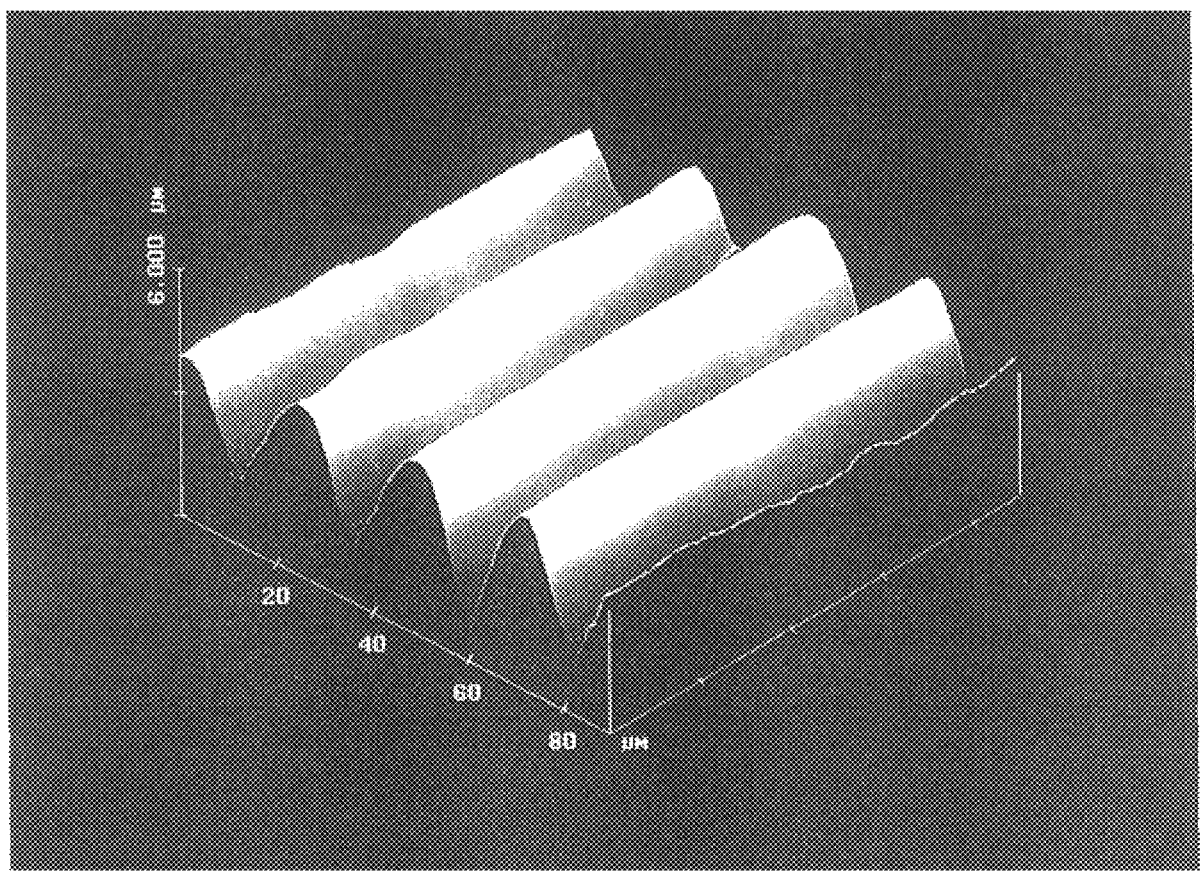
FIG. 2 is a micrograph of atomic force microscope (AFM) on the surface of a material (quartz glass) to be worked.

FIG. 2 shows a micrograph of atomic force microscope (AFM) on the surface A of a material (quartz glass) to be worked 18 which has been worked in accordance with the manner as described above. As is apparent from the AMF micrograph shown in FIG. 2, a periodical grating structure corresponding to a fine pattern of the mask 12 has been formed on the surface A (Although the details of which are not shown, the mask 12 contains a fine pattern corresponding to the grating structure formed on the surface A).

Figure 3:
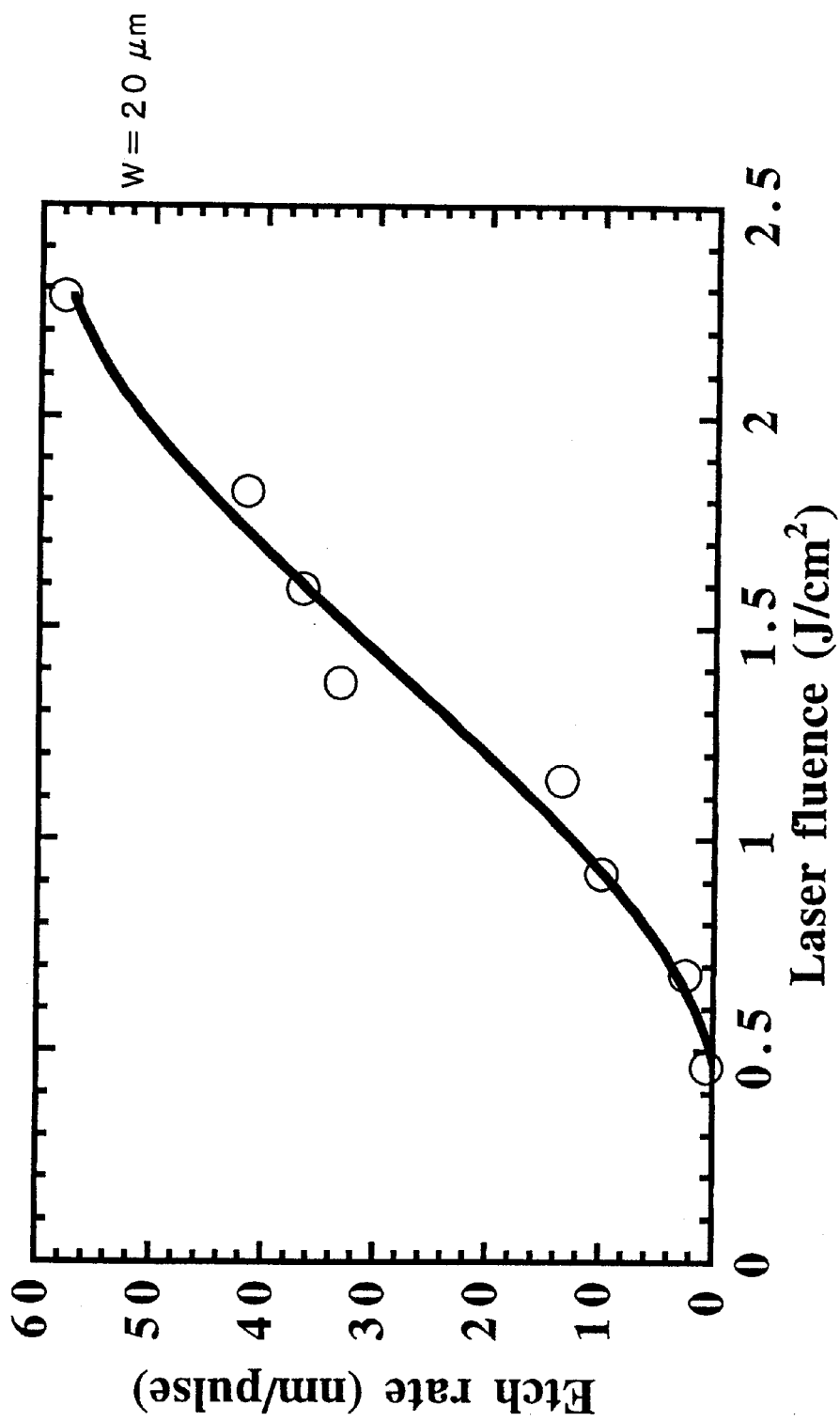
FIG. 3 is a graph showing laser fluence dependence of a working speed in the case where a distance W defined between a material (quartz glass) to be worked and a target (stainless steel) is fixed to 20 $\mu$m.

FIG. 3 is a graph indicating laser fluence dependence of a working speed in the case where a distance defined between the material (quartz glass) to be worked 18 and the target (stainless steel) 20 is fixed to 20 $\mu$m. In the graph of FIG. 3, an etch rate indicating an etch depth per 1 pulse of fourth harmonic of the Nd:YAG laser having 266 nm wavelength is plotted as ordinate and laser fluence as abscissa.

As is clear from the graph of FIG. 3, working by means of the ablation according to the present invention can be made from laser fluence of around 0.5 J/cm2, and its etch rate, i.e., its working speed increases with increase in laser fluence. When the laser fluence was 2.3 J/cm2, an etch rate of about 58 nm/pulse was obtained.

As described above, since a repeated frequency of fourth harmonic of the Nd:YAG laser having 266 nm wavelength is 1 Hz, about two digit larger value than that of reactive ion etching method (RIE) is obtained in accordance with the present invention as a working speed obtained in the case when laser fluence is 2.3 J/cm2.

Figure 4:
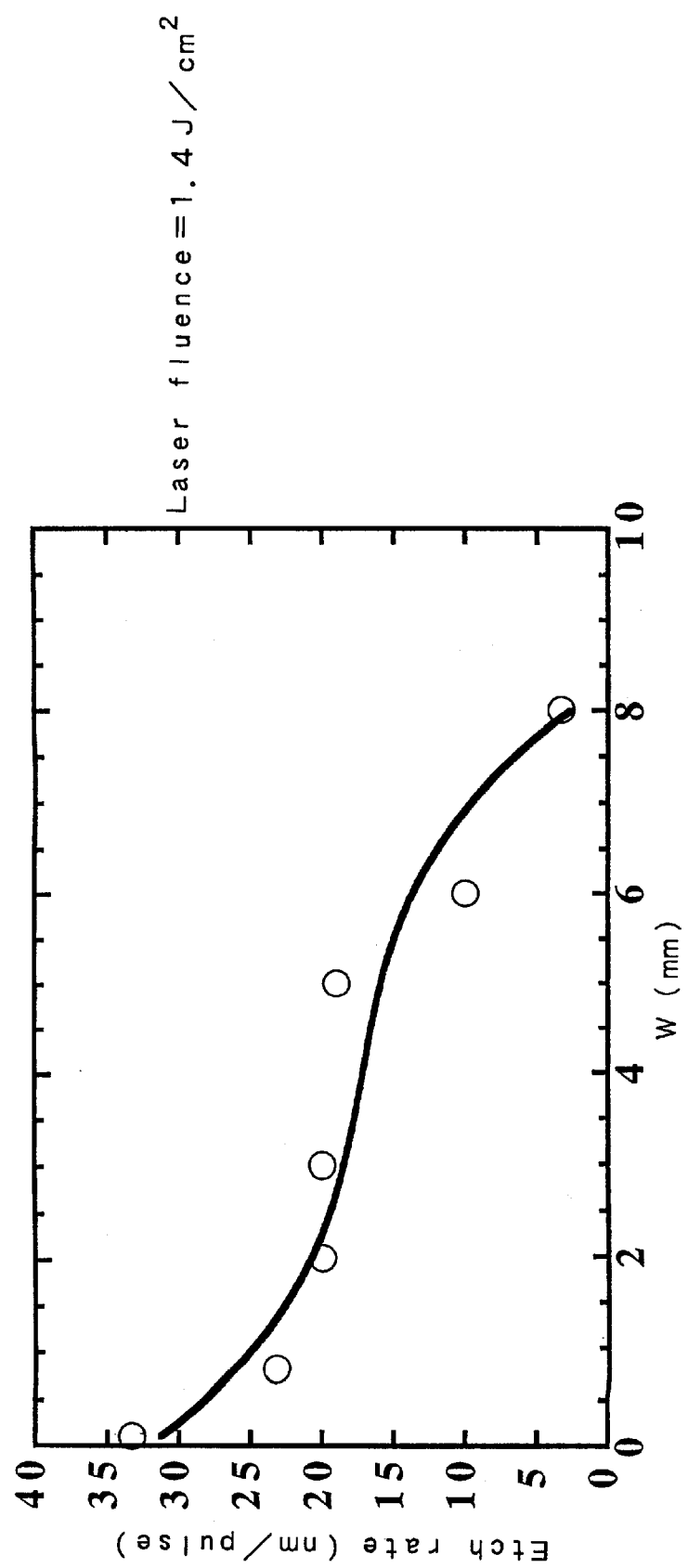
FIG. 4 is a graph showing changes in a working speed in the case where the laser fluence is fixed to 1.4 J/cm2, while a distance W defined between the material (quartz glass) to be worked and the target (stainless steel) is varied.

Moreover, FIG. 4 is a graph showing changes in a working speed in the case where laser fluence is fixed to 1.4 J/cm2, while a distance W defined between the material (quartz glass) to be worked 18 and the target (stainless steel) 20 is varied. In the graph shown in FIG. 4, an etch rate representing an etch depth per 1 pulse of fourth harmonic of the Nd:YAG laser having 266 nm wavelength is plotted as ordinate and a distance W defined between the material (quartz glass) to be worked and the target (stainless steel) 20 as abscissa.

As is apparent from the graph shown in FIG. 4, it is understood that the narrower distance between the material (quartz glass) to be worked 18 and the target (stainless steel) 20 results in the faster working speed. It is acknowledged that this is because emission of light, ions, radicals, and electrons from the plasma produced from the target (stainless steel) 20 act intensively upon the surface A of the material (quartz glass) to be worked 18 due to a narrower distance W between the material (quartz glass) to be worked 18 and the target (stainless steel) 20, so that interactions of emission of light, ions, radicals, and electrons from plasma with fourth harmonic of the Nd:YAG laser having 266 nm wavelength which was input to the material (quartz glass) 18 to be worked function more intensively.

While the above described embodiment has been described in respect of an experiment of the case where fourth harmonic of the laser 10 (Nd:YAG laser) having 266 nm wavelength and 8 nsec pulse width is irradiated as the laser beam in a repeated frequency of 1 Hz by employing quartz glass as the material to be worked 18, stainless steel as the target 20, and an Nd:YAG laser as the laser 10, respectively, any material may be selected as the material to be worked 18, so far as laser beam to be irradiated is transparent with respect to a material selected, in other words, so far as such selected material does not absorb the laser beam irradiated.

Furthermore, a variety of lasers such as visible laser, and infrared laser may be used as the laser 10 in addition to ultraviolet laser, as far as such laser beam is transparent with respect to the material to be worked 18.

Moreover, any material such as ceramics may be selected as the target 20 in addition to metals, so far as such selected material can produce plasma by irradiating laser beam thereon.

While it has been arranged in such that plasma is produced from the target 20 by the use of laser beam irradiated from the laser 10, and at the same time, interactions of the laser beam with emission of light, ions, radicals, and electrons derived from plasma on the surface A of the material to be worked 18 are utilized, the invention is not limited thereto. Namely, laser beam for producing plasma from the target 20 may be separately prepared from that for performing interactions with emission of light, ions, radicals, and electrons on the surface A of the material to be worked 18.

More specifically, it may be arranged in such that laser beam irradiated from the laser 10 is not made to permeate through the material to be worked 18 to irradiate the same upon the target 20, but a path for the laser beam irradiated from the laser 10 is divided into two sections, one of which is made to irradiate upon the material to be worked 18, and the other is made to irradiate upon the target 20. Alternatively, a laser for irradiating laser beam to produce plasma from the target 20 may be separately prepared from a laser for irradiating laser beam to perform interactions with emission of light, ions, radicals, and electrons derived from plasma in the material to be worked 18. In this case, different types of lasers from each other may be used as these separate lasers.

Besides, laser beam for performing interactions with emission of light, ions, radicals, and electrons derived from plasma in the material to be worked 18 may be irradiated from the objective surface A in the material to be worked 18, and in this case, a wavelength of the laser to be applied may be the one which is not transparent with respect to the material to be worked 18.

On one hand, although it has been arranged in such that plasma is produced by irradiating laser beam upon the target 20 in the above described embodiment, the invention is not limited thereto, but plasma or ions, radicals, and electrons may be produced in accordance with the other manners than that described above.

For example, FIG. 5 illustrates the case wherein plasma is produced by means of high frequency current thereby to form ions, radicals, and electrons. In FIG. 5, the same or equivalent components with or to those in FIG. 1 are designated by the same reference characters with those in FIG. 1, respectively, and detailed description therefor will be omitted.

More specifically, a vacuum chamber 16 is provided with a pair of high-frequency electrodes 100 and 102, and when high-frequency current is supplied to these high-frequency electrodes from a high-frequency power source 104, plasma is produced in the vacuum chamber 16 in another embodiment shown in FIG. 5.

In the embodiment of FIG. 5, when it is arranged in such that plasma is produced in a region designated by P1 in the vacuum chamber 16, a surface A, being an objective surface to be worked, of a material to be worked 18 is worked by ablation due to interactions of emission of light, ions, radicals, and electrons derived from plasma with laser beam input to the material to be worked 18. On the other hand, when it is arranged in such that plasma is produced in a region designated by P2 in the vacuum chamber 16, a surface B, being an objective surface to be worked, of a material to be worked 18 is worked by ablation due to interactions of emission of light, ions, radicals, and electrons derived from plasma with laser beam input to the material to be worked 18.

Since the present invention has been constituted as described above, it results in such excellent advantage that a fine pattern can be formed at high speed with respect to a material such as quartz glass exhibiting a remarkable band gap, having a short wavelength at absorption edge of light, and having high bond energy between constituent atoms.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 10-23879 filed on Jan. 21, 1998 including specification, claims, drawings and summary are incorporated herein by reference in its entirety.

What is claimed is:

1. A laser machining method, comprising the steps of:
   irradiating a laser beam transparent with respect to a material to be worked;
   producing plasma simultaneously with said irradiation at a location close to an objective surface of said material to be worked, wherein said location does not directly adjoin said objective surface; and
   generating ablation on said objective surface of said material to be worked by means of interactions of said plasma with the laser beam irradiated upon said material to be worked, thereby to work said material.

2. A laser machining method as claimed in claim 1 wherein said laser beam is irradiated through said material to be worked from a position not facing said objective surface.

3. A laser machining method, comprising the steps of:
   irradiating a laser beam transparent with respect to a material to be worked through a mask having a predetermined pattern;
   producing plasma simultaneously with said irradiation at a predetermined location close to an objective surface of said material to be worked; and
   generating ablation corresponding to the predetermined pattern of said marks on said objective surface of said material to be worked by means of interactions of said plasma with the laser beam irradiated upon said material to be worked through said marks, thereby to work said material.

4. A laser machining method as claimed in claim 3 wherein said laser beam is irradiated through said material to be worked from a position not facing said objective surface.

5. A laser machining apparatus, comprising:
   a material to be worked having an objective surface by means of laser;
   a target opposed to said objective surface of said material to be worked, wherein said target does not directly contact said objective surface of said material to be worked; and
   a laser for irradiating a laser beam transparent with respect to said material to be worked and at the same time, irradiating the transparent laser beam upon said target to produce plasma from said target between said target and said objective surface of said material to be worked;
   ablation being generated on said objective surface of said material to be worked by means of interactions between the plasma produced from said target and said laser beam irradiated upon said material to be worked from said laser, thereby working said material.

6. A laser machining method as claimed in claim 5 wherein said target is located at a distance between 20 $\mu$m to 8 mm from said objective surface of said material to be worked.

7. A laser machining apparatus as claimed in claim 5, comprising further:
   a mask having a predetermined pattern and disposed between said laser and said material to be worked;
   said laser irradiating laser beam upon said material to be worked through said mask; and
   ablation corresponding to said predetermined pattern of the marks being generated on said objective surface of said material to be worked by means of interaction between the plasma produced from said plasma producing means and laser beam irradiated upon said material to be worked from said laser through said mask, thereby to work said material.

8. A laser machining apparatus, comprising:
   a material to be worked having an objective surface by means of laser;
   a laser for irradiating a laser beam through said material to be worked to perform working thereof, said laser being located a position which is not directly facing said objective surface, said laser beam being transparent with respect to said material to be worked; and
   a plasma producing means for producing plasma at a predetermined location close to said objective surface of said material to be worked, wherein said plasma producing means does not directly adjoin said objective surface;
   ablation being generated on said objective surface of said material to be worked by means of interactions between the plasma produced from said plasma producing means and said laser beam irradiated through said material to be worked from said laser, thereby working said material.

9. A laser machining apparatus as claimed in claim 8 wherein said plasma production means location is a distance between 20 $\mu$m to 8 mm from said objective surface of said material to be worked.

10. A laser machining apparatus as claimed in claim 8, comprising further:
    a mask having a predetermined pattern and disposed between said laser and said material to be worked;
    said laser irradiating laser beam upon said material to be worked through said mask; and
    ablation corresponding to said predetermined pattern of the mask being generated on said objective surface of said material to be worked by means of interactions between the plasma produced from said plasma producing means and also beam irradiated upon said material to be worked from said laser through said mask, thereby working said material.

11. A laser machining apparatus, comprising:

a material to be worked having an objective surface by means of laser;

a target opposed to said objective surface of said material to be worked;

a laser for irradiating laser beam upon said material to be worked to perform working thereof; and a second laser for irradiating laser beam upon said target to produce plasma from said target between said target and sad objective surface of said material to be worked;

ablation being generated on said objective surface of said material to be worked by means of interactions between the plasma produced from said target and laser beam irradiated upon said material to be worked from said laser, thereby working said material.

12. A laser machining apparatus as claimed in claim 11, comprising further:

a mask having a predetermined pattern and disposed between said laser and said material to be worked;

said laser irradiating laser beam upon said material to be worked through said mask; and ablation corresponding to said predetermined pattern of the mask being generated on said objective surface of said material to be worked by means of interactions between the plasma produced from said plasma producing means and laser beam irradiated upon said material to be worked from said laser through said mask, thereby working said material.

* * * * *